United States Patent [19]

Irvine et al.

[11] 4,171,128

[45] Oct. 16, 1979

[54] DOCUMENT FEEDER FOR A COPIER

[75] Inventors: Robert Irvine, Riverside; Harry E. Luperti, Wilton, both of Conn.

[73] Assignee: Pitney-Bowes, Inc., Stamford, Conn.

[21] Appl. No.: 866,613

[22] Filed: Jan. 3, 1978

[51] Int. Cl.$^2$ .............................................. B65H 5/22
[52] U.S. Cl. ...................................... 271/3; 271/265; 271/273
[58] Field of Search .................... 271/3, 8A, 265, 273, 271/274

[56] References Cited
U.S. PATENT DOCUMENTS

| | | | |
|---|---|---|---|
| 3,370,844 | 2/1968 | Roberts | 271/265 X |
| 3,428,308 | 2/1969 | Bernard | 271/273 |
| 3,948,511 | 4/1976 | Smith | 271/274 |

*Primary Examiner*—Richard A. Schacher
*Attorney, Agent, or Firm*—Donald P. Walker; William D. Soltow, Jr.; Albert W. Scribner

[57] ABSTRACT

For use with a copier of the type which includes a document illuminating station, a platen at the illuminating station and instrumentalities for flash illuminating respective documents of different thickness at the illuminating station, there is provided a document feeder which includes a plurality of document feeding instrumentalities. A first feeding instrumentality, which is provided for feeding respective documents of different thickness to the platen, includes a first roller disposable in feeding engagement with the respective documents. In addition, a second feeding instrumentality is provided for feeding such documents from the platen, and a third feeding instrumentality is provided for feeding such documents both to and from the platen. Apparatus is provided for translating the first roller into document feeding engagement with the respective documents in response to inserting such documents into document feeding relationship with respect to the first roller.

6 Claims, 4 Drawing Figures

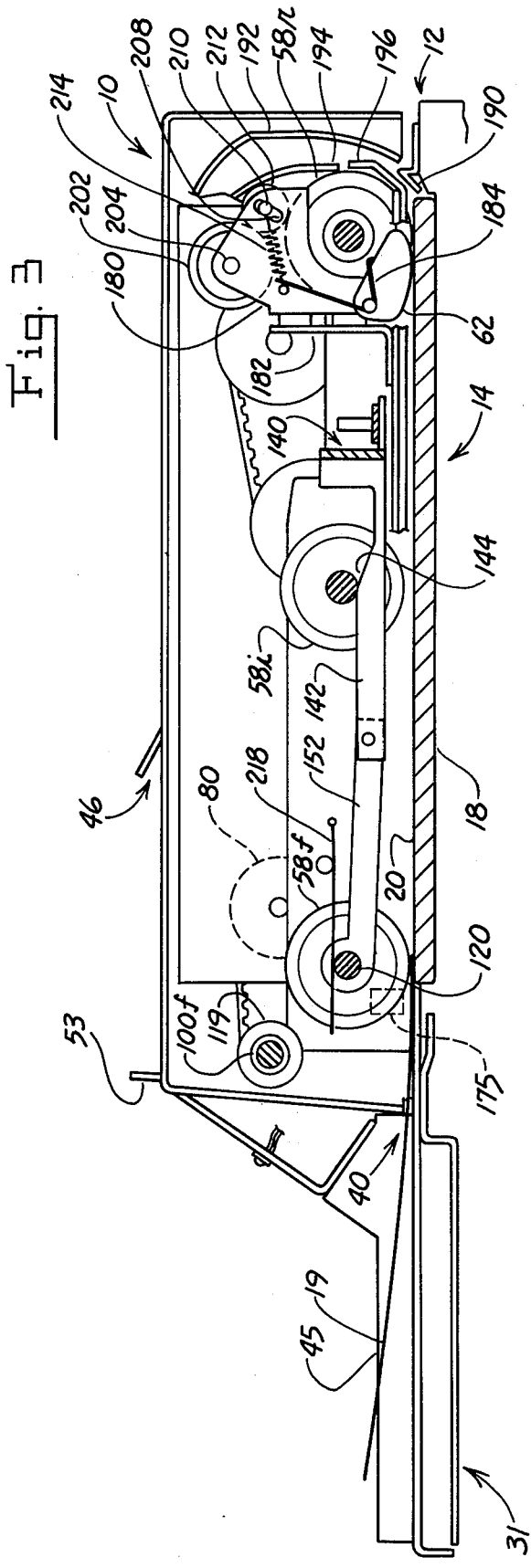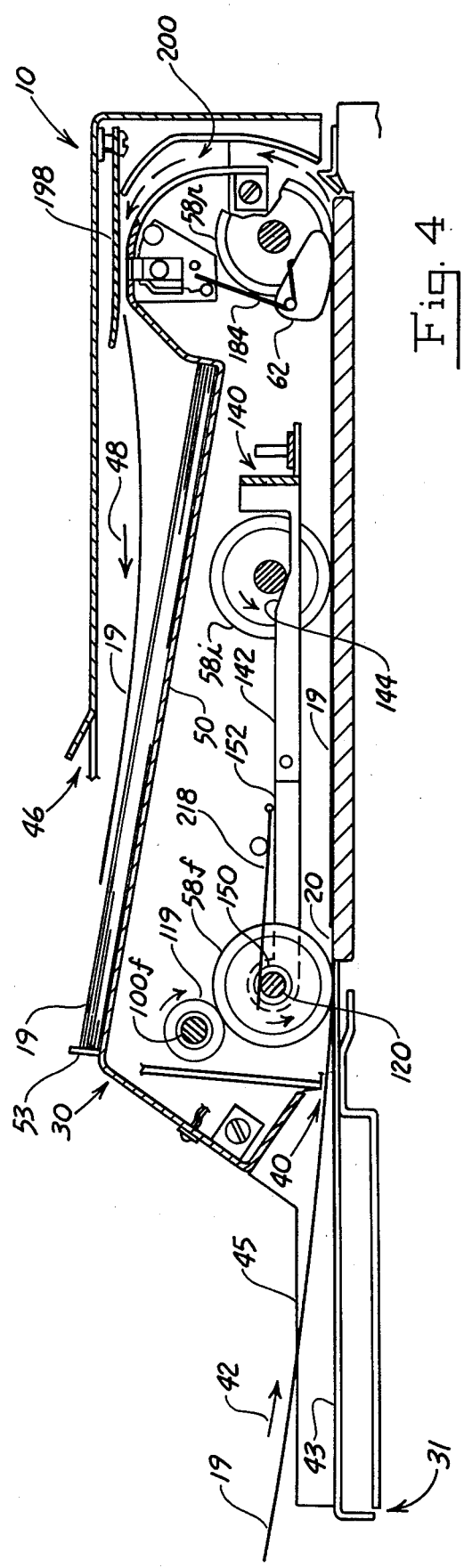

DOCUMENT FEEDER FOR A COPIER

BACKGROUND OF THE INVENTION

This Application is related to Application Ser. No. 805,801, for A Document Feeder For A Copier, filed June 13, 1977 in the name of the present inventors and a third inventor, i.e., Robert E. Manna, and assigned to the same assignee as the present Application.

As shown in U.S. Pat. No. 3,998,542, issued Dec. 21, 1976 to John A. Toto et al, many of such copiers are provided with well-known means for flash illuminating a document, placed by the operator at the copier's document illuminating station, typically a glass platen, to expose the photoreceptor with light modulated by the graphic information on the document; whereupon, the photoreceptor selectively conducts to form the electrostatic latent image on the photoreceptor. Due to the photoreceptor being extremely light sensitive and high intensity light being utilized for flash illumination, imaging occurs on the order of ten (10) milliseconds or less. It is therefore desirable to equip the copier with a document feeder to permit the operator to take advantage of the rapidity with which copies can be made. One of the long standing problems in the prior art resides in the provision of such a document feeder which can handle documents that are of different thickness and diversely calendered.

Application Ser. No. 805,801, referred to above, provides structure for solving the aforesaid problem, whereas the present Application provides an alternate solution to the same problem. Accordingly:

an object of the present invention is to provide a simply constructed document feeder for a copier of the type which utilizes flash illuminating means for making copies of a document, including apparatus for reliably feeding documents of different thickness which are respectively differently calendered; and another object is to provide such a document feeder with instrumentalities insuring positive engagement of the feeding apparatus with each respective document in response to insertion of the respective documents into feeding relationship with respect to the feeding apparatus.

SUMMARY OF THE INVENTION

For use with a copier of the type which includes a document illuminating station, a platen at the illuminating station and means for flash illuminating respective documents at the illuminating station, there is provided a document feeder which includes a plurality of document feeding means. First feeding means are provided for feeding respective documents to the platen. The first feeding means includes roller means disposable in feeding engagement with the respective documents in response to disposition of the respective documents in feeding relationship with respect to the roller means. In addition, second feeding means are provided for feeding documents from the platen, and third feeding means are provided for feeding documents both to and from the platen.

BRIEF DESCRIPTION OF THE DRAWINGS

As shown in the drawings, wherein like reference numerals designate like or corresponding parts throughout the several figures:

FIG. 3 is a sectional view of the document feeder of FIG. 2, with the cover partially removed, taken substantially along the line 4—4 of FIG. 2; and FIG. 4 is a side view of the document feeder of FIG. 2 with the cover partially removed.

DESCRIPTION OF THE PREFERRED EMBODIMENT

Figure 1:
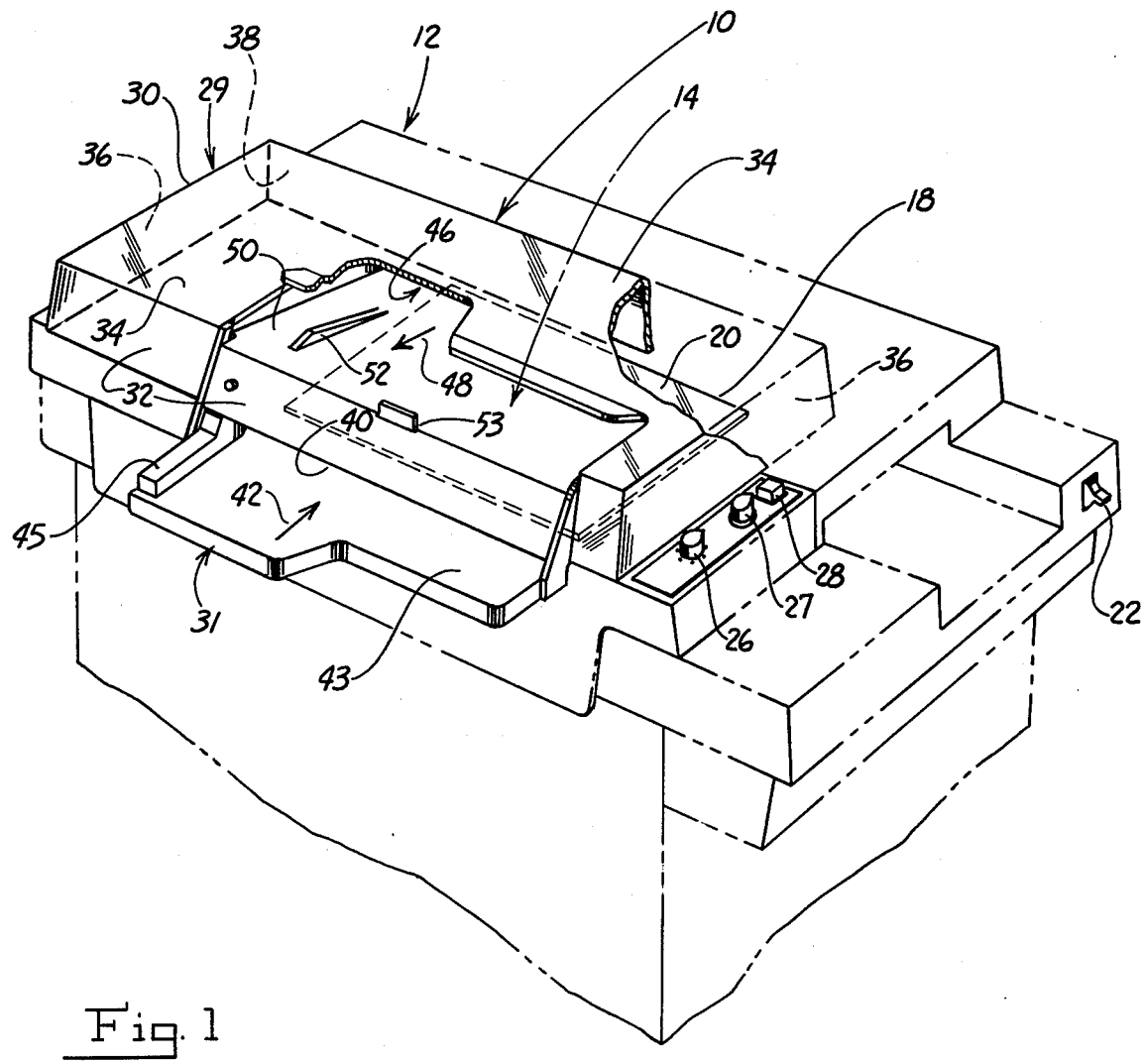
FIG. 1 is a fragmentary perspective view of a copier including a document feeder according to the invention.

As shown in FIG. 1, a document feeder 10, in accordance with the present invention, is suitably removably mounted on a copier 12, over the document illuminating station 14. The copier 12 comprises suitable structure for supporting the various processing means of the copier 12 including a glass platen 18 on which an operator ordinarily places a document 19 (FIG. 4) having graphic information to be copied. The upper surface 20 of the platen 18 generally defines the illuminating station 14 of the copier 12.

The processing means includes such instrumentalities as a suitable photoreceptor (not shown) and suitable electro-optical means (not shown) for flash illuminating the document 19 (FIG. 4) at the illuminating station 14 to expose the photoreceptor to graphic information to be copied. In addition, the processing means comprises suitable well-known means for controlling the various processing instrumentalities of the copier 12 (FIG. 1), including a main power switch 22 for energizing the copier, a first selector switch 26 for choosing the number of copies to be made, a second selector switch 27 for adjusting the visibility of the image on the copy sheet, and a resettable stop-printing switch 28 of general utility.

The document feeder 10 (FIG. 1) comprises a housing 29 including a cover 30, and a frame 31 on which the cover 30 is removably mounted. The cover 30 includes a front wall 32, top wall 34, opposed side walls 36 and a rear wall 38.

The front wall 32 and frame 31 form a document entry aperture 40 (FIGS. 1 and 4) into which successive documents 19 are individually inserted by the operator, in the direction of the arrow 42, for feeding to the document illuminating station 14. To facilitate insertion of such documents 19 of the frame 31 includes a lower platform 43 extending forwardly of the front wall 32, on which documents may be placed for sliding thereon through the aperture 40. To ensure appropriate alignment of the leading edge of the document 19 with respect to the aperture 40, the frame 31 includes a suitably adjustably fixable, translatable, edge guide 45 against which a side edge of a given document 19 may be urged while being slid through the aperture 40.

The top wall 34 (FIG. 1) has a document exit aperture 46 formed therein, through which successive documents 19 (FIG. 4) from the illuminating station 14 are fed by the feeder 10, in the direction of the arrow 48. In this connection, the top wall 34 (FIG. 1) includes a recessed, ramp-like, upper platform 50 to which documents fed through the exit aperture 46 are delivered for retrieval by the operator. To facilitate such retrieval, the upper platform 50 may be provided with an upright, wedge-shaped element 52 which serves to elevate a portion of the leading edge of the respective documents above the platform 50, thereby permitting the operator to insert his/her fingers beneath the documents for grasping the same. An upright stop 53 is preferably provided as the forward end of the platform 50, to arrest forward motion of the documents fed to the platform 50.

Figure 2:
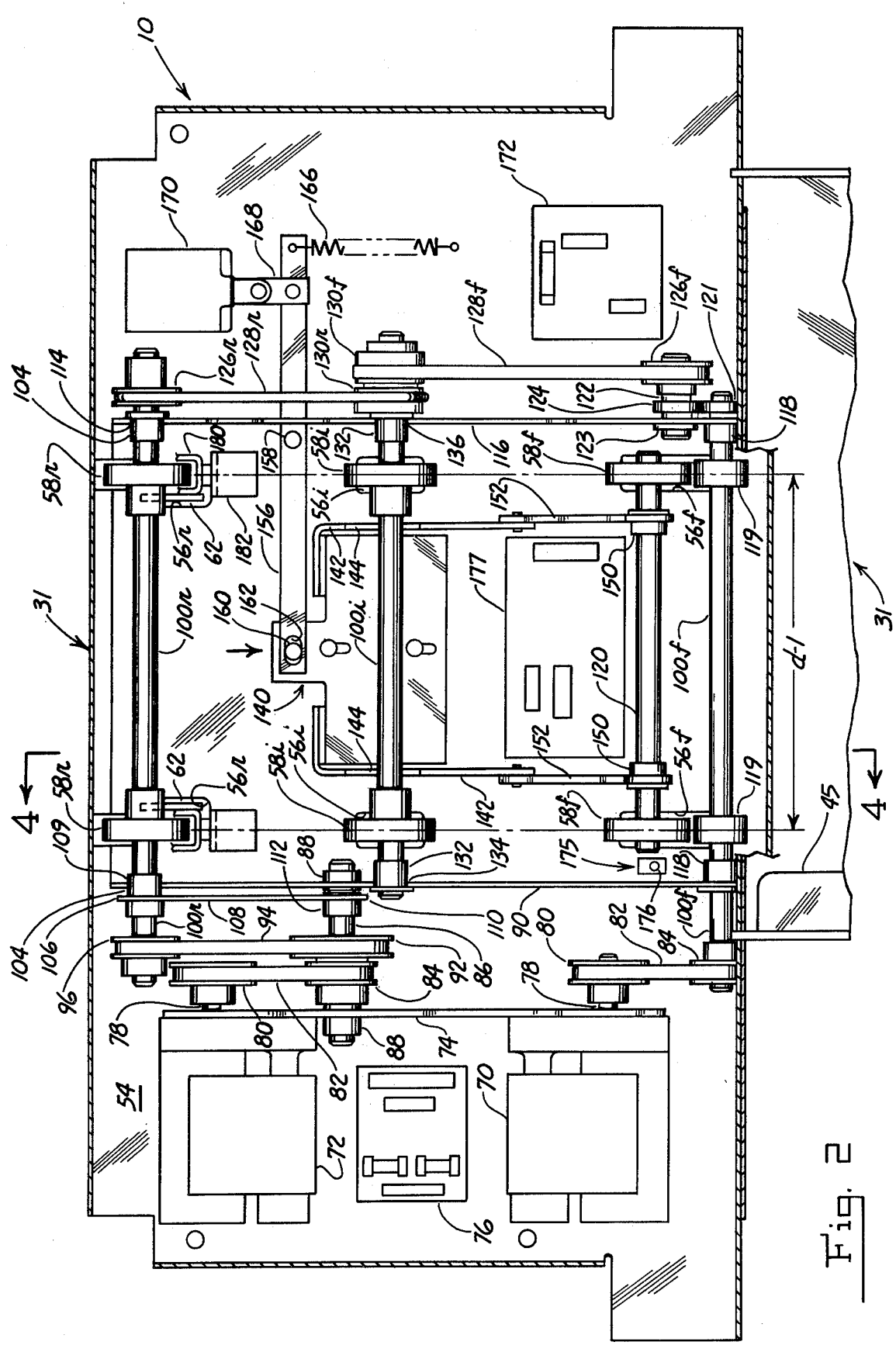
FIG. 2 is an enlarged top plan view of the document feeder of FIG. 1 with the cover thereof removed.

As shown in FIG. 2, the frame 31 comprises a bottom wall 54 which preferably includes a material which appears white to the photoreceptor when a document is flash illuminated for copying purposes. The bottom wall 54 has six apertures 56 formed therein, to accommodate protrusion through the bottom wall 54 of a like number of document feed rollers 58. The respective apertures 56 and rollers 58 are each additionally designated "f", "i" or "r" to distinguish them as being either the forward, intermediate or rear apertures 56 or feed rollers 58, as the case may be. The rear apertures 56r are respectively slightly larger than the forward and intermediate apertures, 56f and 56i, to facilitate additionally accommodating protrusion through the bottom wall 54 of a pair of brake shoes 62, one of which is located adjacent to each of the feed rollers 56r for holding the leading edge of a document 19 (FIG. 4), which is fed to the illuminating station 14, in document feeding engagement with respect to the rear feed rollers 58r for feeding thereby after flash illumination.

As shown in FIG. 2, the feeder 10 includes a source of supply of motive power comprising first and second motors, respectively designated 70 and 72, which are respectively suitably fixedly attached to a mounting plate 74 which is, in turn, suitably anchored to the frame 31. The motors, 70 and 72, are each adapted by well-known means to be electrically connected to the copier 12 (FIG. 1) via suitable well-known control means 76 (FIG. 2), for energization and deenergization by the control means 76 when a document 19 (FIG. 4) is inserted into the feeder 10 as hereinafter discussed. Each of the motors, 70 and 72 (FIG. 2), includes a drive shaft 78, on which there is suitably fixedly mounted a pulley 80 about which an endless timing belt 82 is looped for transmitting rotational movement of the pulley 80 to another pulley 84.

The pulley 84 (FIG. 2) which is driven from the motor 72, is suitably fixedly attached to an idler shaft 86 for rotation thereof. The opposite ends of of the idler shaft 86 are respectively supported for rotation by a suitable bearing 88. One of the bearings 88 is fixedly attached to the mounting plate 74, and the other bearing 88 is fixedly attached to another mounting plate 90 suitably anchored to the frame 31. An additional pulley 92, fixedly attached to the idler shaft 86 for rotation therewith, has another endless timing belt 94 looped thereabout for transmitting rotational movement of the pulley 92 to yet another pulley 96, which is fixedly attached to a rear roller drive shaft 100r for rotation thereof. The opposite ends of the rear roller drive shaft 100r (FIG. 2), are each supported for rotation in a suitable bearing 104 such that the shaft 100r longitudinally extends parallel to to the entry aperture 40 (FIG. 4) and is vertically movable away from the copier platen 18 (FIG. 1) by a given document 19 (FIG. 4) against suitable spring tension (as hereinafter discussed) tending to urge the shaft 100r towards the copier platen 18 (FIG. 1). To accommodate such vertical movement: one of the bearings 104 (FIG. 2) is fixedly attached to one end, 106, of a pivot arm 108 and mounted for vertical movement in a slot 109 formed in the mounting plate 90; the other end 110 of the pivot arm 108 is fixedly attached to another bearing 112 pivotably mounted on the idler shaft 86; and the other bearing 104 is mounted for vertical movement in a slot 114 formed in a mounting plate 116 suitably anchored to the frame 31. The respective rear feed rollers 58r are fixedly mounted on the rear drive shaft 100r, spaced a predetermined distance "d-1" from each other, for direct rotation by the rear drive shaft 100r in engagement with a document 19 (FIG. 4) fed to the platen 18.

On the other hand, the pulley 84 (FIG. 2) which is driven from the motor 70, is fixedly attached to a forward feed roller drive shaft 100f which, in accordance with the invention, indirectly, rather than directly, drives the forward feed rollers 58f in engagement with documents 19 (FIG. 4) fed thereto. As shown in FIG. 2, the opposite ends of the forward drive shaft 100f are each supported for rotation in a suitable bearing 118, such that the shaft 100f longitudinally extends parallel to the entry aperture 40 (FIG. 4). One of the bearings 118 (FIG. 2) is fixedly attached to the mounting plate 90 and the other bearing 118 is fixedly attached to the mounting plate 116. A pair of auxiliary drive rollers 119, are fixedly mounted on the drive shaft 100f, spaced apart from each other the aforesaid predetermined distance "d-1," for rotation with the shaft 100f. And, the forward feed rollers 58f are fixedly mounted on an auxiliary drive shaft 120. The auxiliary drive shaft 120 is adapted to be translated (as hereinafter discussed) toward and away from the drive shaft 100f to dispose the forward feed rollers 58f in and out of contact with the auxiliary drive rollers 119 for rotation thereby. In addition, a gear 121 is suitably fixedly mounted on the forward drive shaft 100f for transmission of rotational movement of the shaft 100f to an idler shaft 122 which is mounted for rotation in a bearing 123 fixedly attached to the mounting plate 116. And another gear 124 is fixedly attached to the idler shaft 122 and disposed in intermeshing engagement with the forward drive shaft gear 121 for rotation of the idlers shaft 122.

A pair of pulleys, 126f and 126r, are provided for transmitting rotational movement of the respective forward and rear drive shafts, 100f and 100r, to an intermediate roller drive shaft 100i. To that end, one of the pulleys 126f is fixedly mounted on the aforesaid idler shaft 122 and the other pulley 126r is fixedly mounted on the rear drive shaft 100r. And the pulleys, 126f and 126r, are respectively provided with belts, 128f and 128r, looped thereabout for transmitting rotational movement thereof to the intermediate roller drive shaft 100i via respective over-running clutches, 130f and 130r, both of which are mounted on one end of the intermediate drive shaft 100i. The opposite ends of the intermediate drive shaft 100i (FIG. 2) are respectively supported for rotation by a suitable bearing 132 such that the shaft 100i longitudinally extends parallel to the forward and rear drive shafts, 100f and 100r, and is vertically movable away from the copier platen 18 (FIG. 4) against the force of gravity tending to urge the shaft 100i toward the copier platen 18. To accommodate vertical movement of the shaft 100i (FIG. 2), one of the bearings 132 is mounted for vertical movement in a slot 134 formed in the mounting plate 90, and the other bearing 132 is mounted for vertical movement in a slot 136 formed in the mounting plate 116. The respective intermediate feed rollers 58i, are spaced from each other the same distance "d-1" as the rear feed rollers 58r are from each other, and fixedly attached to the intermediate drive shaft 100i for rotation therewith. The clutches, 130f and 130r, are operated out of unison with each other, in the sense that when one of the clutches, 130f or 130r, is operated, the other clutch, 130f or 130r, is not operated. When the motor 70 is energized, to drive the forward drive shaft 100f, for rotating the forward feed rollers 58f, (as hereinafter discussed), clutch 130f overruns clutch 130r. As a result, rotational movement of the forward drive shaft 100f is transmitted to the intermediate drive shaft 100i for rotating the intermediate feed rollers 58i in unison with the forward feed rollers 58f. On the other hand, when the motor 72 is energized, to drive the rear drive shaft 100r for rotating the rear feed rollers 58r, clutch 130r over-runs clutch 130f; as a result of which, rotational movement of the rear drive shaft 100r is transmitted to the intermediate drive shaft 100i for rotation of the intermediate feed roller 58i in unison with the rear feed rollers 58r.

As shown in FIG. 4, the intermediate feed rollers 58i are disposed in document feeding relationship with respect to the platen 18. On the other hand, as shown in FIG. 3, the intermediate rollers 58i are disposed out of document feeding relationship with respect to the platen 18. When a document 19 is being fed by either the forward or rear feed rollers, 58f or 58r, the intermediate feed rollers 58i are disposed in document feeding engagement with respect to the document 19 (FIG. 4), and the appropriate clutch, 130f or 130r, is engaged for driving the intermediate feed roller shaft 100i, and thus the roller 58i, from the forward or rear drive shaft, 100f or 100r, as the case may be. On the other hand, after the document 19 (FIG. 4) is fed to the illuminating station 14 and before illumination of the document 19, the intermediate feed roller shaft 100i is raised to lift the intermediate feed rollers 58i out of document feeding engagement with the document 19, to permit the document 19 to settle on the platen 18 before making copies thereof.

For timely raising and lowering the intermediate rollers 58i, there is provided a shaft engaging member 140 (FIG. 2), slidably connected to the frame 31. The member 140 includes a pair of spaced parallel arms 142 extending beneath the intermediate shaft 100i. Each of the arms 142 (FIGS. 3 and 4) has a ramp-like camming surface 144 adjacent to the intermediate shaft 100i. When the shaft engaging member 140 is moved rearwardly, as shown in FIG. 3, the intermediate shaft 100i is cammed upwardly by the arms 142 to raise the rollers 58i out of document feeding engagement with the document 19 fed to the platen 18. When the shaft engaging member 140 is moved forwardly, as shown in FIG. 4, the intermediate shaft 100i is lowered to dispose the rollers 58i in document feeding engagement with the document 19 fed to the platen 18.

Further, as shown in FIG. 4 the forward feed rollers 58f are disposed in engagement with the auxiliary forward feed rollers 119, whereby rotational movement of the forward feed roller drive shaft 100f is transmitted to the forward feed rollers 58f. On the other hand, as shown in FIG. 3, the forward feed rollers 58f are disposed out of engagement with the auxiliary feed rollers 119 whereby rotational movement of the forward drive shaft 100f is not transmitted to the forward feed rollers.

For timely moving the auxiliary drive shaft 120 forwardly, and thus forwardly moving the feed rollers 58f into engagement with the auxiliary feed rollers 119, the opposite ends of the drive shaft 120 are each mounted for rotation in a bearing 150. And the respective bearings 150 are each fixedly secured to one end of an arm 152 having its other end pivoted to one of the arms 142 of the intermediate drive shaft engaging member 140 for movement therewith. As a result of this arrangement, when the shaft engaging member 140 is moved rearwardly (FIG. 3), to raise the intermediate feed rollers 58i out of document feeding relationship with respect to the platen 18, the forward feed rollers 58f are disposed out of driven engagement with auxiliary rollers 119. On the other hand, when the shaft engaging member 140 is moved forwardly (FIG. 4), to lower the intermediate feed rollers 58i into document feeding relationship with respect to the platen 18, the forward feed rollers 58f are disposed in driven engagement with the auxiliary forward feed rollers 119.

To move the shaft engaging member 140 there is provided a rocker arm 156 pivoted to the frame 31 as by means of a pivot shaft 158 suitably anchored to the frame 31. One end of the rocker arm 156 is suitably movably connected to the shaft engaging member 140, as by means of a pin 160 extending from the member 140 and into engagement with a slot 162 formed in the rocker arm 156. The other end of the rocker arm 156 is connected to the frame 31, by means of a tension spring 166, and is also pivotably connected to one end of a link 168 which has its other end suitably connected to a solenoid 170 for movement thereby. The solenoid 170 is suitably electrically connected to a control logic circuit 172 which is electrically connected in parallel with the motor driving circuit 76 for operating the solenoid 170 in timed relationship with respect to operation of the respective motors 70 and 72. When the solenoid 170 is not operated, the link 168 is forwardly disposed, as shown in FIG. 2, due to the tension of the spring 166. Accordingly, the intermediate rollers 58i (FIG. 3) are disposed out of document feeding relationship with respect to the platen 18, and the forward feed rollers 58f are disposed out of document feeding engagement with the auxiliary feed rollers 119. On the other hand, when the solenoid 170 is operated, the link 168 is pulled rearwardly, against the tension of the spring 166, thereby rotating the rocker arm 156 about the pivot pin 158 to move the shaft engaging member 140 (FIG. 4) forwardly, lowering the intermediate rollers 58i into document feeding engagement with the document 19 on the platen 18 and moving the forward feed rollers 58f into engagement with the auxiliary feed rollers 119 for driving the forward rollers 58f from the forward drive shaft 100f.

To commence rotation of the forward drive shaft 100f, suitable photoelectric means 175 are provided, including a photocell 176, which acts as a print switch and is suitably located beneath the forward feed roller auxiliary drive shaft 120 adjacent to one of the forward feed rollers 58f, so as to detect the presence of a document 19 fed beneath the forward feed rollers 58f when the rollers 58f are located out of contact with the auxiliary rollers 119 (FIG. 3), and for detecting the absence of such documents 19. The photoelectric means 175 also includes suitable well-known circuitry 177 associated with the photocell 176 for signalling the motor control circuit 76 and the control logic circuitry 172, to timely energize the motor 70 and solenoid 170 during a predetermined time interval while the photocell 176 detects a document 19 and to deenergize the solenoid 170 during a predetermined time interval after the photocell 176 is uncovered by such a document 19. In operation, the operator feeds a document 19 into document feeding relationship with respect to the forward feed rollers 58f. When the document 19 (FIG. 3) is detected by the photocell 176, the forward drive shaft 100f, and thus the auxiliary forward feed rollers 119, do not immediately commence rotating, since the motor 70 is not immediately energized. On the other hand, since the solenoid 170 is immediately energized in response to the photocell detecting a document 19, the forward feed rollers 58f are rolled forwardly over the leading edge of the document 19 detected by the photocell 176, so as to positively dispose the feed rollers 58f in feeding engagement with the document 19 fed thereto. Also, the intermediate feed rollers 58i are lowered into document feeding relationship with respect to the platen 18. Then the forward drive shaft 100f commences rotating. Whereupon, the forward feed rollers 58f feed the document 19 to the platen 18, and the intermediate feed rollers 58i continue such feeding to locate the document 19 beneath the brake shoes 62 and in feeding engagement with the rear feed rollers 58r. Thus the time interval during which the forward feed rollers 58f do not rotate is the interval during which the solenoid 170 urges the forward feed rollers 58f into feeding engagement with the auxiliary feed rollers 119. Further, the time interval during which the forward feed rollers 58f are driven by the motor 70 is the interval during which the feed rollers 58f and 58i feed the document to the rear feed rollers 58r. As shown in FIGS. 2 and 3, the brake shoes 62 are each pivotally attached to a bracket 180 fixedly attached to an L-shaped angle member 182 anchored to the frame 31. Each of the brake shoes 62 is urged, by means of a spring 184 (FIG. 3), to protrude through the rear aperture 56r (FIG. 2), with which it is associated, so as to lightly rest on the platen 18 (FIG. 3) when a document 19 is not disposed thereon. When a document 19 (FIG. 4) is fed to the illuminating station 14, the document 19 slidably engages the respective brake shoes 62 to pivot the brake shoes 62 upwardly against the tension of the spring 184, which in turn urges the brake shoes 62 downwardly to hold the leading edge of the document 19 in document feeding engagement with the rear feed rollers 58r, prior ro raising the intermediate feed rollers 58i out of document feeding engagement with the document 19 on the platen 18. The brake shoes 62 thus serve to maintain a document 19 in proper document feeding engagement with the rear feed rollers 58r after the intermediate feed rollers 58i are raised, even though document settling tends to move the document relative to the rollers 58r after the intermediate feed rollers 58i the forward feed rollers 58f are moved rearwardly so as to expose the photocell 176 while a document 19 on the platen 18 is being flash illuminated for copying purposes. To prevent the photoelectric means 175 from being prematurely energized and at the same time permitting the operator to insert another document 19 into the feeder for subsequent copying purposes, while a previous document 19 is being copied, the logic circuit 172 disables operation of the photocell 176 during the time interval in which a document 19 is disposed on the platen 18 for copying purposes, as determined by the setting of the number-of-copies selector switch 26.

To assist the rear rollers 58r in feeding a document 19 (FIG. 4) to the upper platform 50 for retrieval by the operator, the document feeder 10 includes a plurality of guide plates 190, 192, 194, 196 and 198 (FIGS. 3 and 4). The guide plates 190, 192, 194, 196 and 198 define an upwardly and forwardly curvedly-extending channel 200 (FIG. 4) through which documents 19 are fed from the platen 18 to the upper platform 50. The rear feed rollers 58r partially extend into the channel 200 in the vicinity of the guide plates 190 and 196 (FIG. 3) to urge document 19 (FIG. 4) into and through the channel 200. In addition, for rear roller assistance purposes, there is provided a pair of upper rollers 202 (FIG. 3), one of which is associated with each of the rear rollers 58r and is rotatably mounted on a shaft 204. Each of the upper rollers 202 partially extends into the channel 200 through the guide plate 194 for engaging documents 19 (FIG. 4) fed into the channel 200 by the rear rollers 58r. To promote traction between the documents 19 and upper rollers 202, the guide plate 198 may be, in its entirety, a leaf spring or may include a leaf spring portion, extending downwardly and into resilient engagement with the upper rollers 202 for urging documents 19 into engagement with the upper rollers 202. To rotate the upper rollers 202, each of the brackets 180 (FIG. 3) includes a slot 208 in which there is mounted a shaft 210. The shaft 210 has an idler roller 212 mounted thereon. A tension spring 214 is provided, which extends from the shaft 210 and is anchored to the bracket 180, for urging the outer periphery of the idler roller 212 into rolling engagement with the outer peripheries of the associated rear feed roller 58r and upper roller 202 to transmit rotational movement of the rear feed roller 58r to the upper roller 202.

The forward and rear feed rollers 58f and 58r are mounted for movement toward and away from the platen 18. To that end, the forward auxiliary drive shaft 120f is resiliently urged, by means of one or more leaf springs 218 (FIG. 3), toward the platen 18; and the rear drive shaft 100r is resiliently urged toward the platen 18 by the tension springs 214. When a document 19 (FIG. 4) inserted into document feeding engagement with the forward, intermediate or rear rollers, 58f, 58i or 58r, as the case may be, the document 19 raises the respective rollers, 58f, 58i or 58r, to accommodate the document 19. The respective springs 218 and 214, urge the forward and rear drive shafts, 100f and 100r, downwardly, to maintain the forward and rear rollers, 58f and 58r, in document feeding engagement with the particular document 19 being fed to and from the platen 18; whereas the force of gravity, acting on the intermediate drive shaft 100i and rollers 58i, maintains the intermediate rollers 58i in document feeding engagement with a document 19 on the platen 18 until the solenoid 170 is operated to raise the intermediate feed rollers 58i for document settling purposes.

In accordance with the objects of the invention there has been described a document feeder for a copier of the type which includes means for flash illuminating documents, wherein the document feeder includes means for reliably feeding documents of different thickness which are respectively calendered.

Inasmuch as certain changes may be made in the above described invention without departing from the spirit and scope of the same, it is intended that all matter contained in the above description or shown in the accompanying drawings shall be interpreted in an illustrative rather than in a limiting sense. And it is intended that the following claims be interpreted to cover all the generic and specific features of the invention herein described.

What is claimed is:

1. A document feeder adapted for use with a copier having a document illuminating station, a platen at the illuminating station and means for flash illuminating respective documents on the platen, the document feeder comprising:

(a) first document feeding means for rearwardly feeding respective documents to the platen, said first document feeding means including a rotatable drive shaft and at least one roller mounted thereon for rotation therewith, said drive shaft mounted for forward translation of said at least one roller into document feeding engagement with respective documents, means for forwardly translating said drive shaft and thereby said at least one roller in response to respective documents being rearwardly fed into document feeding relationship with said at least one roller, and said drive shaft mounted for elevation of said at least one roller to accommodate respective documents of different thickness;

(b) second document feeding means for feeding respective documents from the illuminating station after illumination thereof; and (c) third document feeding means cooperative with the first document feeding means for feeding respective documents to the platen.

2. The document feeder according to claim 1, wherein said means for translating said drive shaft includes photoelectric means responsive to respective documents being rearwardly fed into document feeding relationship with respect to said at least one roller, and said translating means including means for timely translating said drive shaft.

3. A document feeder for a copier having a document illuminating station, a platen at the illuminating station and means for flash illuminating respective documents on the platen for document copying purposes, the document feeder comprising:

(a) first document feeding means adapted to accommodate respective documents of different thickness rearwardly fed thereto, said first feeding means including first roller means forwardly translatable toward and into engagement with the respective documents of different thickness disposed in document feeding relationship with respect to said first roller means;

(b) second document feeding means adapted to accommodate respective documents of different thickness, said second feeding means including second roller means movable in engagement with the respective documents of different thickness for rearwardly feeding respective documents from the platen after illumination thereof;

(c) third document feeding means including means adapted to accommodate respective documents of different thickness, said third document feeding means including third roller means movable into and out of engagement with the respective documents of different thickness for feeding respective documents to the platen; and (d) means for holding respective documents of different thickness on the platen in document feeding engagement with said second movable means.

4. The document feeder according to claim 3, wherein the first feeding means includes a first drive shaft having said first roller means mounted thereon, said first feeding means including a second drive shaft having fourth roller means mounted thereon, and said translating means including means for forwardly translating said second drive shaft toward said first drive shaft for disposing said first roller means in driven engagement with said fourth roller means, whereby rotation of said second drive shaft is transmitted through said fourth roller means to said first roller means for rearwardly feeding documents engaged by said first roller means.

5. A document feeder adapted for use with a copier having a document illuminating station, a platen at the illuminating station, means for flash illuminating respective documents on the platen, and first means for rearwardly feeding documents from the platen after illumination thereof, the document feeder comprising: second document feeding means for rearwardly feeding respective documents to the platen, said second document feeding means including a first rotatable drive shaft and a first roller mounted on said first drive shaft for rotation therewith and in document feeding engagement with respective documents of different thickness, said second document feeding means including means for forwardly translating said first drive shaft and thus said first roller into document feeding engagement with said respective documents, and means actuating said translating means in response to disposing respective documents in feeding relationship with respect to said first roller.

6. The document feeder according to claim 5, wherein said second document feeding means includes a second rotatable drive shaft and a second roller mounted thereon for rotation therewith, said second drive shaft fixedly mounted for rotation in place, and said translating means adapted to translate said first drive shaft and thus said first roller into engagement with said second roller, whereby rotation of said second roller by said second drive shaft is transmitted to said first roller for rotating said first roller in engagement with respective documents disposed in feeding engagement with said first roller.

* * * * *